United States Patent
Dever

[15] 3,668,971
[45] June 13, 1972

[54] METHOD AND APPARATUS FOR MACHINING AN ELONGATED WORKPIECE

[72] Inventor: Lewis A. Dever, Cincinnati, Ohio
[73] Assignee: Cincinnati Milacron Inc., Cincinnati, Ohio
[22] Filed: June 2, 1970
[21] Appl. No.: 42,757

[52] U.S. Cl. ..........................90/11 R, 90/11 C, 90/15, 90/16, 90/17, 90/DIG. 2
[51] Int. Cl. ..........................................................B23c 3/00
[58] Field of Search ...............90/15, 11 R, 17, 11 C, DIG. 2, 90/16; 51/56, 238 S

[56] References Cited

UNITED STATES PATENTS

| | | | |
|---|---|---|---|
| 3,538,812 | 11/1970 | Morel | 90/11 R X |
| 3,494,253 | 2/1970 | Hood et al. | 90/11 X |
| 3,559,530 | 2/1971 | Wagner | 90/15 X |

*Primary Examiner*—Gil Weidenfeld
*Attorney*—Frank C. Leach, Jr.

[57] ABSTRACT

An elongated workpiece, which is maintained under tension, is machined along its surfaces by relative longitudinal movement between the workpiece and a support for a pair of perpendicularly disposed cutting tools. A fixture, which is connected to the support for the cutting tools so that the fixture is always the same longitudinal distance from the cutting tools, has the elongated workpiece pass therethrough. The fixture has two reference surfaces, which are perpendicular to each other, against which two perpendicular surfaces of the workpiece are urged by pressure rollers in the fixture acting against workpiece surfaces, which are parallel to the surfaces of the workpiece engaging the reference surfaces.

27 Claims, 6 Drawing Figures

METHOD AND APPARATUS FOR MACHINING AN ELONGATED WORKPIECE

In aerospace structures, many long members such as spars, for example, are employed with each of the members having a relatively small cross sectional area and varying in cross sectional shape between its ends. These spars are usually produced from bar stock shapes, which are either rolled or extruded, by machining operations such as profile milling, for example.

To carry out the machining operation, the workpiece has previously been attached along its length by clamps or fixtures to the table of a machine tool. If the spars were not too long, the table has been moved longitudinally to move the workpiece relative to a cutting tool, which progressively mills away a portion of the bar stock to provide the desired cross section of varying shape.

For relatively long spars, the work table is normally stationary, and the cutting tool is carried by a gantry, which travels along the table to provide longitudinal movement of the cutting tool relative to the workpiece. By using the movable gantry arrangement, the over-all length of the machine is reduced; this decreases the amount of shop floor space required for workpieces of relatively long length.

In both long and short spar milling operations, the conventional machine table is a very expensive part of the machine. This is because of both its relatively large size and the requirement for very accurate surfaces to enable obtaining of the desired configuration or shape of the spar throughout its length.

Furthermore, the use of fixtures or clamps along the length of the workpiece interferes with the access of the cutting tool to the workpiece. Thus, in some instances, the interference requires several set-ups during the machining operation to complete surfaces, which should be generated continuously to avoid discontinuities.

In addition to the problem of the discontinuity in a workpiece surface, which should be generated continuously, the time necessary to release a workpiece from the machine table and then again attach it to the machine table is frequently excessive because of the large size of the workpiece, its lack of rigidity, and the requirement for close tolerance machining. Accordingly, this produces an undesirable amount of idle time of a very expensive machine resulting in substantially higher production costs.

Irrespective of the type of clamp or fixture used to connect the workpiece to the machine table, most spars must be rotated on the machine about their longitudinal axes to permit access to other sides. Accordingly, several set-ups are required, and costs are affected unless provision is made for quick set-up.

To reduce the number of set-ups, it has previously been suggested to use a fixture to hold the spar and present one section of the spar at a time for machining by the cutting tool. Upon completion of machining of a section, the spar is released, shifted to present another section for machining by the cutting tool, and then clamped again in the new position.

However, this releasing and reclamping of the workpiece results in small inaccuracies, which produce slight discontinuities in the surface being machined. While the discontinuity is slight, this is unsatisfactory in an aerospace part since this slight discontinuity produces a stress concentration in the part, which is designed to tolerances very close to the practical limits of the strength of the material.

Furthermore, in the section by section milling of a spar, the varying overhang of the workpiece from the fixture causes a varying deflection of the workpiece during cutting since machining occurs at positions of varying overhang of the workpiece from the fixture. This results in inaccuracies in the dimensions of the spar.

Thus, in the section by section milling of a workpiece, the adjacent portions of two sections are subjected to the extreme opposite conditions. That is, the portion, which is closest to the fixture, is most rigid, and has the least overhang, of one section is adjacent the portion, which is farthest from the fixture, is least rigid, and has the most overhang, of the next section. This substantial difference in the support of the two adjacent portions of the workpiece accentuates the discontinuity problem. Therefore, section by section machining of an elongated workpiece such as a spar, for example, has not been entirely satisfactory.

The present invention satisfactorily overcomes the foregoing problems to enable an elongated workpiece such as an aerospace spar, for example, to be machined to the desired tolerance along its entire length at a relatively reasonable cost. The apparatus of the present invention eliminates the large machine table and does not require any tolerance to be referenced therefrom.

The present invention utilizes a fixture, which remains a constant longitudinal distance from the cutting tool at all times. Accordingly, the deflection of the workpiece at the cutting position is substantially uniform whereby the tolerances of the workpiece may be maintained throughout the length of the workpiece.

By machining the workpiece immediately adjacent to the fixture, the apparatus of the present invention enables the workpiece to have a very good rigidity even without a supporting table. This also aids in enabling the workpiece to be machined to the desired tolerances.

Since it is not necessary to clamp any intermediate portion of the workpiece to a support table or the like, there is no requirement for any down time to change the set-up. This not only reduces the production cost but also eliminates the discontinuities in a workpiece surface that has previously been produced by changing the set-up.

Furthermore, the installation of a workpiece in the fixture of the present invention can be accomplished in a much shorter period of time. This also reduces the production cost since more parts can be produced in the same period of time.

It should be understood that this invention is not applicable to all elongated workpieces because of their cross sectional shapes. However, a significant percentage of aerospace parts is particularly suited for machining by the method and apparatus of the present invention.

An object of this invention is to provide a method and apparatus for machining an elongated workpiece without any discontinuity in any machined surface.

Another object of this invention is to provide a method and apparatus for machining an elongated workpiece in which the same reference surfaces are always used irrespective of the portion of the workpiece being machined.

Other objects of this invention will be readily perceived from the following description, claims, and drawings.

This invention relates to an apparatus for machining an elongated workpiece having a plurality of surfaces at angles to each other including means to place an elongated workpiece under tension and cutting means to cut at least one surface of the workpiece. The apparatus has means to provide at least one reference surface against which a surface of the workpiece is urged by means. Relative longitudinal movement between the cutting means and the workpiece is produced by suitable means to cut at least the one surface of the workpiece along its length. Means maintains the providing means a predetermined longitudinal distance from the cutting means during machining.

This invention also relates to a method for machining an elongated workpiece having a plurality of surfaces at angles to each other including placing the elongated workpiece under tension and urging a surface of the workpiece against a reference surface. The method includes cutting the workpiece along at least one surface with cutting means, producing relative longitudinal movement between the workpiece and the cutting means to cut the surface of the workpiece along substantially its entire length, and maintaining the reference surface a fixed longitudinal distance from the cutting means during machining.

The attached drawings illustrate a preferred embodiment of the invention, in which.

Figure 1:
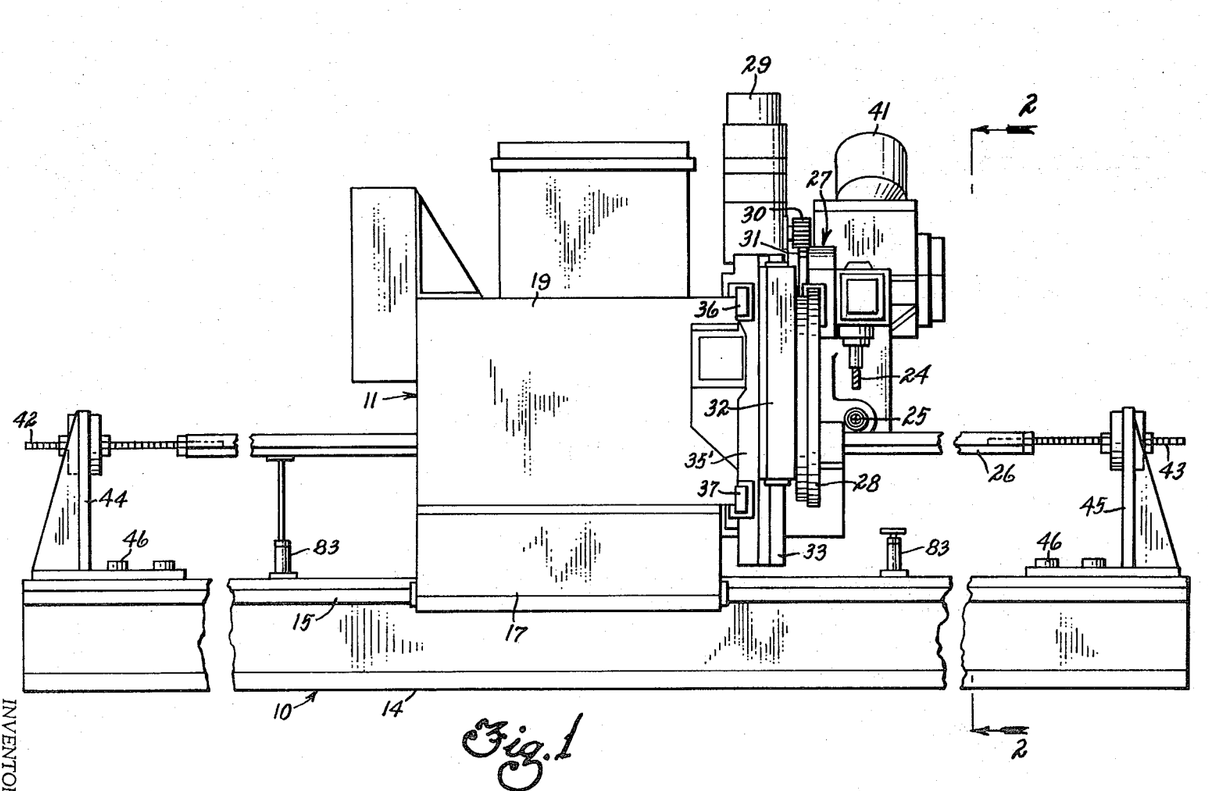
FIG. 1 is a side elevational view of a milling machine in which the fixture of the present invention is employed.
Figure 2:
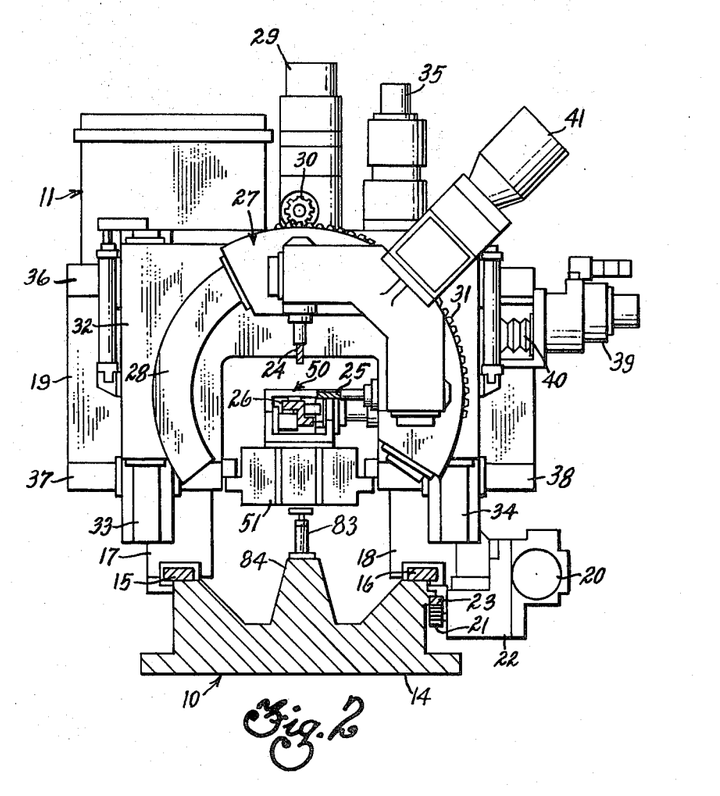
FIG. 2 is an end elevational view, partly in section, of the machine of FIG. 1 and taken along line 2—2 of FIG. 1.

Referring to the drawings and particularly FIGS. 1 and 2, there is shown a base structure 10 on which a spindle carrier unit 11 is slidably supported. As shown in FIG. 2, the base structure 10 comprises a bed 14, which is leveled and supported off a floor (not shown).

The bed 14 has a pair of parallel, horizontally disposed ways 15 and 16 thereon. The ways 15 and 16 support the spindle carrier unit 11 for longitudinal movement therealong.

The spindle carrier unit 11 includes a bridge upright 17, which rides on the way 15, and a bridge upright 18, which rides on the way 16. The uprights 17 and 18 are connected to each other by a cross member 19.

The spindle carrier unit 11 is driven longitudinally along the ways 15 and 16 by a hydraulic feed motor 20, which is supported on the bridge upright 18. The feed motor 20 rotates a pair of anti-backlash pinion gears (one shown at 21) through a transmission 22. The pinion gears mesh with a rack 23, which is fixed to the bed 14 and parallel to the way 16. Accordingly, energization of the feed motor 20 moves the spindle carrier unit 11 longitudinally along the ways 15 and 16.

The spindle carrier unit 11 supports cutting tools 24 and 25, which have their axes of rotation perpendicular to each other, thereon for longitudinal movement therewith. Accordingly, as the cutting tools 24 and 25 move longitudinally with the spindle carrier unit 11, an elongated workpiece 26, which has its ends supported by the bed 14, has one or more surfaces machined along substantially its entire length during each movement of the cutting tools 24 and 25 along substantially the entire length of the workpiece 26.

The cutting tools 24 and 25 are supported on an arcuate saddle 27, which is movable along an arcuate way 28 to position the cutting tools 24 and 25 at various angles relative to the longitudinal axis of the workpiece 26. The arcuate saddle 27 is driven along the arcuate way 28 by a hydraulic feed motor 29. As shown in FIG. 1, the arcuate saddle feed motor 29 drives a pinion gear 30, which meshes with a rack 31 on the arcuate saddle 27. Accordingly, rotation of the pinion gear 30 drives the arcuate saddle 27 along the arcuate way 28.

The arcuate way 28 is fixedly mounted on a vertical saddle 32, which is slidably supported on parallel, vertical ways 33 and 34 (see FIG. 2). A hydraulic feed motor 35 drives the vertical saddle 32 along the vertical ways 33 and 34 through a ball screw (not shown). The vertical movement of the vertical saddle 32 moves the cutting tools 24 and 25 vertically relative to the workpiece 26.

The vertical ways 33 and 34 are fixed to a cross saddle 35' for support thereby. The cross saddle 35' is slidably supported on an upper cross way 36 and a pair of lower cross ways 37 and 38, which are spaced from each other. The cross ways 36–38 are supported by the cross member 19 of the spindle carrier unit 11. The cross saddle 35' is driven along the cross ways 36–38 by a hydraulic feed motor 39, which is connected to the cross saddle 35' through a ball screw (not shown) disposed within a boot 40.

Accordingly, the cutting tools 24 and 25 can be moved vertically, transversely, and arcuately relative to the workpiece 26. This enables machining of any surface of the workpiece 26, which is Z-shaped.

The cutting tools 24 and 25 are driven by an electric motor 41, which is supported by the arcuate saddle 27. The motor 41 can drive both of the cutting tools 24 and 25 simultaneously or only one of the cutting tools 24 and 25 with the other in a neutral position. The motor 41 is connected to the cutting tools 24 and 25 through a gear train (not shown). Thus, if desired, the cutting tools 24 and 25 can cut two different surfaces of the workpiece 26 at the same time.

The workpiece 26 is supported by the bed 14 through having screws 42 and 43 secured to opposite ends thereof and supported by angle plates 44 and 45, respectively, which are fastened to the bed 14 by machine screws 46. The use of the screws 42 and 43 in cooperation with the fixed angle plates 44 and 45 results in the desired tension being placed on the workpiece 26.

The elongated workpiece 26 is supported intermediate its ends and adjacent the cutting tools 24 and 25 by a fixture 50. The fixture 50 is fixed to a support 51, which is carried by the cross member 19 of the spindle carrier unit 11 for movement only longitudinally with the spindle carrier unit 11. Thus, the fixture 50 is always the same longitudinal distance from the cutting tools 24 and 25.

Figure 3:
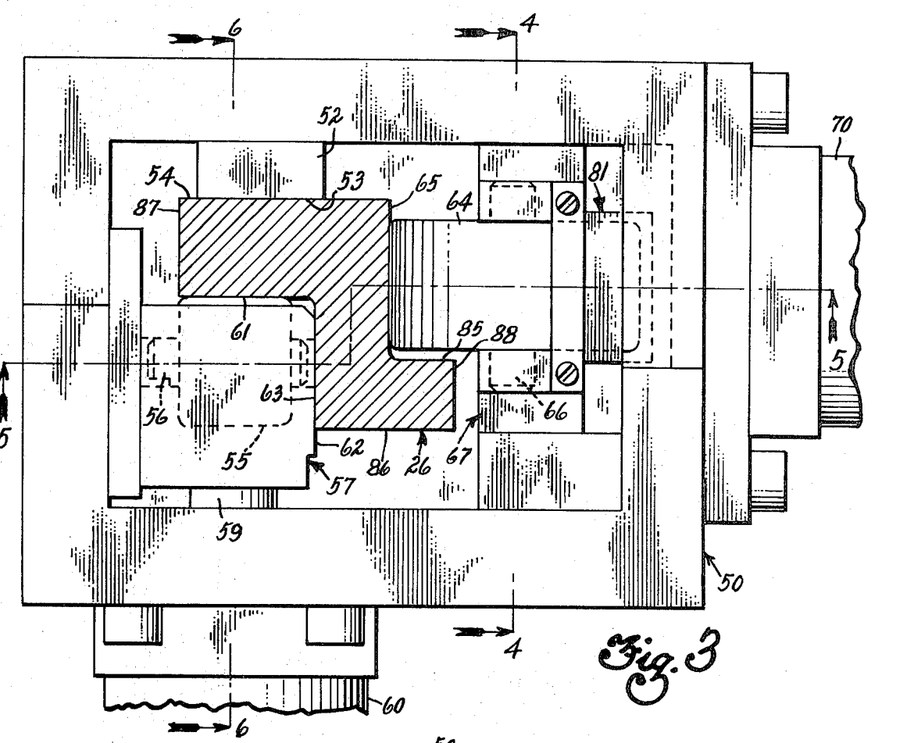
FIG. 3 is an enlarged end elevational view, partly in section, of the fixture of the present invention.
Figure 4:
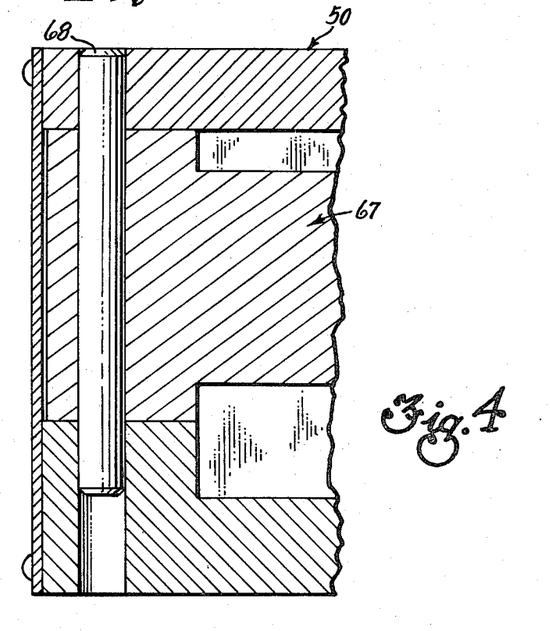
FIG. 4 is a vertical sectional view of a portion of the fixture of FIG. 3 and taken along line 4—4 of FIG. 3.

As shown in FIG. 3, the fixture 50 includes a block 52, which has a reference surface 53 against which a surface 54 of the workpiece 26 bears. The surface 54 of the workpiece 26 is urged against the reference surface 53 of the fixture 50 by a pressure roller 55, which is rotatably supported on a shaft 56 (see FIG. 6) carried on a pivotally mounted lever 57. The lever 57 is pivotally supported in the fixture 50 by a pin 58.

A piston rod 59 of a piston slidable in a hydraulic cylinder 60, which is carried by the fixture 50, acts against a surface of the lever 57 between the pivot pin 58 and the roller 55. Accordingly, this moves the roller 55 into engagement with a surface 61, which is substantially parallel to the surface 54, of the workpiece 26 to continuously urge the surface 54 of the workpiece 26 into engagement with the reference surface 53 of the block 52 of the fixture 50. Therefore, this insures that the surface 54 of the workpiece 26 bears against the reference surface 53 during machining of the workpiece 26.

In addition to rotatably supporting the roller 55, the lever 57 has its surface 62 (see FIGS. 3 and 5), which is perpendicular to the reference surface 53, function as a second reference surface against which a surface 63, which is perpendicular to the surface 54, of the workpiece 26 bears. The surface 63 of the workpiece 26 is urged against the reference surface 62 by a pressure roller 64 acting against a surface 65 of the workpiece 26. The surface 65 is parallel to the surface 63, which bears against the reference surface 62. The pressure roller 64 insures that the surface 63 of the workpiece 26 bears against the reference surface 62 during machining.

The pressure roller 64 is rotatably mounted on a shaft 66, which is supported on a lever 67. The lever 67 is pivotally mounted on the fixture 50 through a pin 68. A piston rod 69 of a piston slidable in a hydraulic cylinder 70, which is carried by the fixture 50, acts against a surface of the lever 67 between the pivot pin 68 and the roller 64 to exert a pressure through the roller 64 on the workpiece 26.

Accordingly, two of the surfaces of the workpiece 26 are maintained against the reference surfaces 53 and 62 of the fixture 50 at a fixed longitudinal distance from the cutting tools 24 and 25 at all times. Therefore, the same amount of deflection exists in the workpiece 26 at the cutting position irrespective of the portion of the length of the workpiece 26 that is being machined.

The lever 57 has a passage 71 (see FIG. 6) therein to which a cleaning fluid is supplied through a hose 72. The cleaning fluid is sprayed from the passage 71 on the surface 61 of the workpiece 26 through a passage 73 in the lever 57 to remove chips on the surface 61 from any previous cut.

Figure 6:
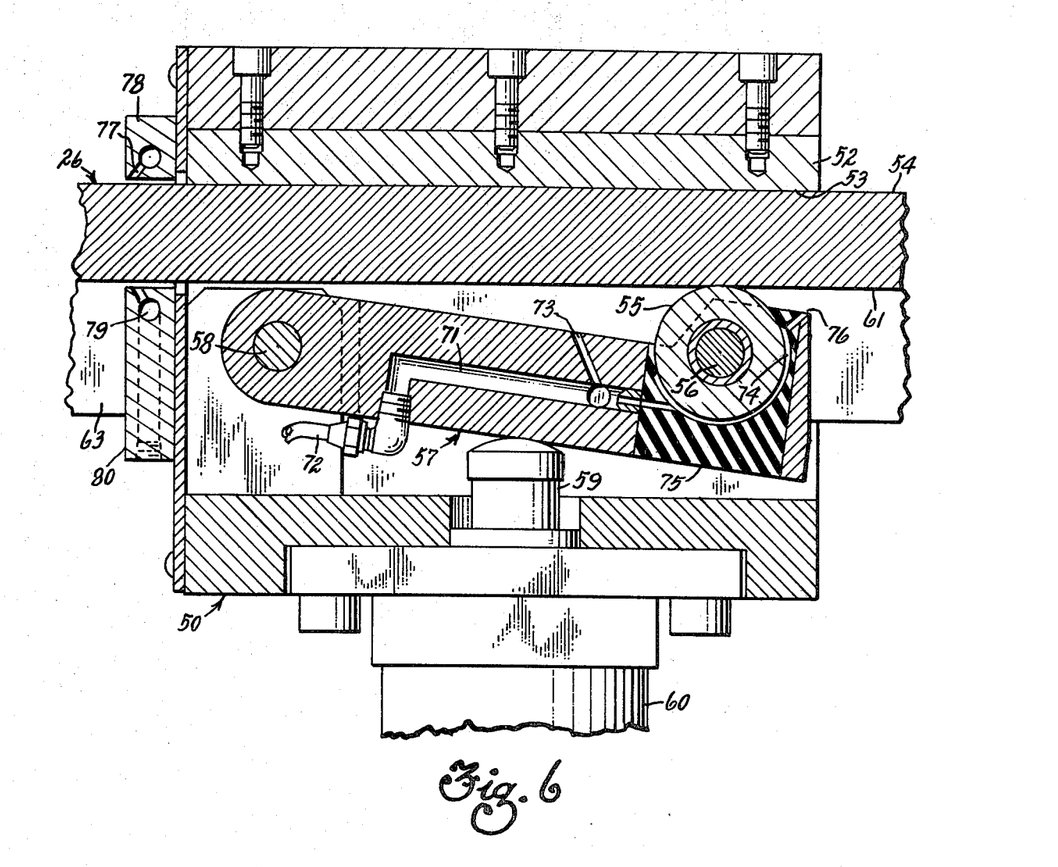
FIG. 6 is a vertical sectional view, partly in elevation, of the fixture of FIG. 3 and taken along line 6—6 of FIG. 3.

The passage 71 in the lever 57 also communicates with a chamber 74 within which the roller 55 is disposed. The cleaning fluid passes from the chamber 74, which is formed in a resilient portion 75 of the lever 57, through opening 76 in the resilient portion 75 to spray the roller 55 and other portions of the surface 61 with the cleaning fluid whereby the chips are removed from the roller 55 and the surface 61 of the workpiece 26.

The resilient portion 75 has lips on each end to allow the cleaning fluid to exit therebetween and wipe the roller 55 to prevent the chips from entering between the roller 55 and the workpiece 26. The lips of the resilient portion 75 cooperate with the roller 55 so that the cleaning fluid issues as a thin film.

Cleaning fluid also is sprayed on the surface 54 of the workpiece 26 from a passage 77 in a block 78, which is supported by the fixture 50. This cleaning fluid removes chips on the surface 54 from any previous cutting operations of the workpiece 26 prior to the reference surface 53 engaging the cleaned portion of the surface 54.

Cleaning fluid also is directed on the surface 63 of the workpiece 26 from a passage 79 in a block 80. The block 80 is supported by the portion of the fixture 50 having the lever 57 mounted therein. The cleaning fluid removes chips on the surface 63 from any previous cutting operations prior to the reference surface 62 engaging the cleaned portion of the surface 63.

Figure 5:
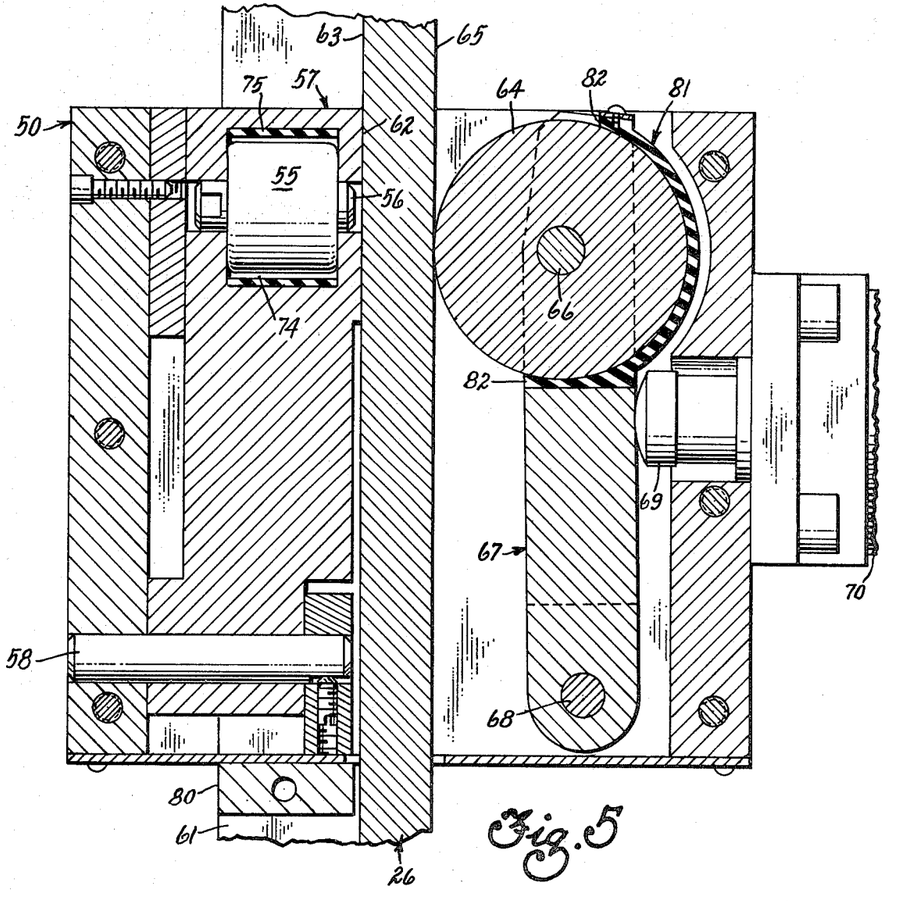
FIG. 5 is a horizontal sectional view of a portion of the fixture of FIG. 3 and taken along line 5—5 of FIG. 3.

As shown in FIG. 5, the roller 64 does not have any cleaning fluid supplied around it although a supply arrangement could be added if desired. The roller 64 is mounted in the lever 67 so as to be surrounded by a resilient portion 81. The resilient portion 81 has lips 82 to wipe the roller 64 to keep chips from between the roller 64 and the workpiece 26.

The cleaning fluid may be either air or a coolant, for example. However, the coolant is preferred.

Because of the length of the workpiece 26, it is necessary to support the workpiece 26 intermediate its ends in addition to the support by the fixture 50. Any suitable means, which can be moved out of the way when the spindle carrier unit 11 moves longitudinally relative to the workpiece 26, may be employed.

One suitable example of the workpiece support means is a hydraulic jack 83, which is supported on a center portion 84 of the bed 14 as shown in FIG. 2. As shown in FIG. 1, one of the jacks 83 is supporting the workpiece 26 while another of the jacks 83 is in a position in which the fixture 50 and the support 51 on the spindle carrier unit 11 may move longitudinally without being interfered with by the jack 83.

It should be understood that the spindle carrier unit 11 moves to the left in FIG. 1 when cutting a surface of the workpiece 26. Thus, the lowered jack 83 may now be raised and the raised jack 83 must be lowered before the fixture 50 and the support 51 reach it. The jacks 83 are controlled by limit switches (not shown), which are mounted on the base structure 10 to raise and lower the jacks 83 in accordance with the position of the spindle carrier unit 11 on the bed 14.

Considering the operation of the present invention, the spindle carrier unit 11 is positioned at the right end of the base structure 10 with the elongated workpiece 26 supported between the angle plates 44 and 45 under the desired tension. The spindle carrier unit 11 is moved the entire length of the elongated workpiece 26 so that one or two of the surfaces of the elongated workpiece 26 can be cut at the same time by the cutting tools 24 and 25. After completion of the cut along one or two of the surfaces of the workpiece 26, the spindle carrier unit 11 is again returned to the right end of the base structure 10 to cut the same surfaces again or additional surfaces of the workpiece 26 depending on the profile of each surface. This continues until each of the surfaces of the workpiece 26 has been machined to the desired shape throughout substantially the entire length of the workpiece 26 as each end of the workpiece 26 is not machined.

As an example, with the cutting tools 24 and 25 in the position of FIG. 2, the cutting tool 25 can cut surfaces 85 and 86 (see FIG. 3) of the workpiece 26. The surfaces 85 and 86 are parallel to the surfaces 54 and 61.

In the position of FIG. 2, the cutting tool 24 can cut the surface 65 and surfaces 87 and 88 (see FIG. 3), which are parallel to the surface 65. Likewise, the cutting tool 24 also can cut the surface 85, if desired, rather than the cutting tool 25.

When rotated 90° counterclockwise from the position of FIG. 2, the cutting tool 24 can cut the surfaces 61 and 63 (see FIG. 3) of the workpiece 26. This is accomplished by cutting the surface 61 with the periphery of the cutting tool 24 and the surface 63 with the end of the cutting tool 24.

Of course, when the cutting tools 24 and 25 are rotated 90° counterclockwise from the position of FIG. 2, the tool 25 is in a vertical position so that it actually could machine some of the surfaces, if desired, that the cutting tool 24 can cut when in the position of FIG. 2. The tool 25 also could perform the cutting operations on the surface 85, if desired, in either the position of FIG. 2 or when the tools 24 and 25 are rotated 90° counterclockwise from the position of FIG. 2.

It is preferred that the surfaces 54 and 63 of the workpiece 26 be machined last since they bear against the reference surfaces 53 and 62, respectively. By rotating the cutting tools 24 and 25 90° counterclockwise from the position of FIG. 2, both the surfaces 54 and 63 of the workpiece 26 could be machined simultaneously through using the cutting tool 25 to cut the surface 54 and the cutting tool 24 to cut the surface 63. However, in most arrangements, the surfaces 54 and 63 would be cut separately with the surface 54 last and both being cut by the tool 24.

When the surface 65 has been cut, it no longer presents a smooth surface to the roller 64. However, the roller 64 maintains a sufficient pressure to hold the surface 63 of the workpiece 26 against the reference surface 62. Whenever these variations in the surface 65 occur, the roller 64 is moved either forwardly or rearwardly. When moved rearwardly, a relief valve in the supply line to the hydraulic cylinder 70 allows some of the fluid in the cylinder 70 to escape therefrom when the piston within the cylinder 70 is pushed away from the workpiece 26 due to the piston rod 69 being moved by the roller 64 following the configuration of the surface 65.

Likewise, when the surface 61 of the workpiece 26 has been machined, it no longer presents a smooth even surface for the roller 55. In the same manner as described for the roller 64, the roller 55 maintains a pressure on the surface 61 to hold the surface 54 of the workpiece 26 against the reference surface 53.

While the present invention has shown the reference surfaces at a right angle, it should be understood that the reference surfaces could be at other than a right angle if the workpiece 26 had a shape in which the surfaces, which bear against the reference surfaces, were at other than a right angle. It is only necessary that the reference surfaces be at the same angle to each other as the angle of the surfaces of the workpiece bearing against the reference surfaces.

While the spindle carrier unit 11 and the fixture 50 have been shown and described as being movable longitudinally relative to the workpiece 26, it should be understood that it is only necessary that there be relative longitudinal movement between the cutting tools 24 and 25 and the workpiece 26 with the fixture 50 maintaining the reference surfaces 53 and 62 the same predetermined longitudinal distance from the cutting tools 24 and 25 at all times. Accordingly, the spindle carrier unit 11 could be stationary and the workpiece 26 mounted on a movable table with the fixture 50 still secured to the spindle carrier unit 11 so as to not be movable longitudinally relative to the cutting tools 24 and 25.

While the fixture 50 of the present invention has been shown and described as having two reference surfaces, it should be understood that only one reference surface might be employed if an elongated workpiece were to be cut only along a single surface, for example. The maximum required number of reference surfaces in the fixture 50 is only two irrespective of the shape of the workpiece.

While the workpiece 26 has been shown as being Z-shaped, it should be understood that any other shape could be employed depending on the starting bar stock shape. It also should be understood that it is not necessary for the surfaces of the workpiece to be substantially perpendicular to each other.

When the surface 63 is being cut by the cutting tool 24, the surface 63 is being urged away from the reference surface 62 of the fixture 50 by the cutting tool 24. However, the roller 64 exerts sufficient pressure to retain the surface 63 against the reference surface 62.

An advantage of this invention is that surfaces of an elongated workpiece are formed without any discontinuity therein. Another advantage of this invention is that the machining costs of an elongated workpiece are reduced. A further advantage of this invention is that there is no change in the reference surface for tolerances throughout the machining of most of the surfaces of the workpiece.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. An apparatus for machining an elongated workpiece having a plurality of surfaces at angles to each other including:
   means to place an elongated workpiece under tension along its longitudinal axis;
   cutting means to cut at least one surface of the workpiece;
   means to provide at least one reference surface;
   means to urge a surface of the workpiece against said reference surface, said reference surface being fixed against movement in the direction in which said urging means urges the surface of the workpiece against said reference surface;
   means to produce relative longitudinal movement between said cutting means and the workpiece to cut at least the one surface of the workpiece along its length;
   and means to maintain said providing means a predetermined longitudinal distance from said cutting means during machining.

2. The apparatus according to claim 1 in which said providing means has a pair of reference surfaces at an angle to each other that is the same as the angle between two surfaces of the workpiece that said urging means urges against said reference surfaces, each of said reference surfaces being fixed against movement in the direction in which said urging means urges the surface of the workpiece thereagainst.

3. The apparatus according to claim 2 in which said reference surfaces of said providing means are substantially perpendicular to each other.

4. The apparatus according to claim 3 in which said producing means moves said cutting means longitudinally to create the relative longitudinal movement between said cutting means and the workpiece.

5. The apparatus according to claim 4 in which said maintaining means includes means to connect said providing means and said cutting means to each other for longitudinal movement together.

6. The apparatus according to claim 3 in which said providing means includes means to introduce a cleaning fluid against at least one of the surfaces being cut by said cutting means and having one of said urging means and said reference surfaces engaging therewith.

7. The apparatus according to claim 3 in which said urging means acts against each of a pair of surfaces of the workpiece with each of the pair of surfaces being substantially parallel to one of the surfaces of the workpiece bearing against one of said reference surfaces.

8. The apparatus according to claim 3 in which:
   said urging means comprises two separate urging means;
   and each of said separate urging means includes:
   a roller acting on a surface of the workpiece that is substantially parallel to a surface of the workpiece bearing against one of said reference surfaces;
   lever means rotatably supporting said roller;
   and means acting on said lever means to exert a force thereon to maintain said roller against the surface of the workpiece irrespective of the configuration of the surface of the workpiece.

9. The apparatus according to claim 3 including a plurality of longitudinally spaced means to support the workpiece intermediate its ends, each of said support means being rendered ineffective when disposed adjacent the portion of the workpiece being cut by said cutting means.

10. The apparatus according to claim 2 in which said producing means moves said cutting means longitudinally to create the relative longitudinal movement between said cutting means and the workpiece.

11. The apparatus according to claim 10 in which said maintaining means includes means to connect said providing means and said cutting means to each other for longitudinal movement together.

12. The apparatus according to claim 2 in which said providing means includes means to introduce a cleaning fluid against at least one of the surfaces being cut by said cutting means and having one of said urging means and said reference surfaces engaging therewith.

13. The apparatus according to claim 2 in which said urging means acts against each of a pair of surfaces of the workpiece with each of the pair of surfaces being substantially parallel to one of the surfaces of the workpiece bearing against one of said reference surfaces.

14. The apparatus according to claim 2 in which:
   said urging means comprises two separate urging means;
   and each of said separate urging means includes:
   a roller acting on a surface of the workpiece that is substantially parallel to a surface of the workpiece bearing against one of said reference surfaces;
   lever means rotatably supporting said roller;
   and means acting on said lever means to exert a force thereon to maintain said roller against the surface of the workpiece irrespective of the configuration of the surface of the workpiece.

15. The apparatus according to claim 2 including a plurality of longitudinally spaced means to support the workpiece intermediate its ends, each of said support means being rendered ineffective when disposed adjacent the portion of the workpiece being cut by said cutting means.

16. The apparatus according to claim 1 in which said producing means moves said cutting means longitudinally to create the relative longitudinal movement between said cutting means and the workpiece.

17. The apparatus according to claim 16 in which said maintaining means includes means to connect said providing means and said cutting means to each other for longitudinal movement together.

18. The apparatus according to claim 1 in which said providing means includes means to introduce a cleaning fluid against at least the one surface being cut by said cutting means.

19. The apparatus according to claim 1 in which said urging means acts against a surface of the workpiece that is substantially parallel to the surface of the workpiece bearing against said reference surface.

20. The apparatus according to claim 1 in which said urging means includes:
   a roller acting on a surface of the workpiece that is substantially parallel to the surface bearing against said reference surface;
   lever means rotatably supporting said roller;
   and means acting on said lever means to exert a force thereon to maintain said roller against the surface of the workpiece irrespective of the configuration of the surface of the workpiece.

21. The apparatus according to claim 1 including a plurality of longitudinally spaced means to support the workpiece intermediate its ends, each of said support means being rendered ineffective when disposed adjacent the portion of the workpiece being cut by said cutting means.

22. A method for machining an elongated workpiece having a plurality of surfaces at angles to each other including:
   placing the elongated workpiece under tension along its longitudinal axis;

urging a surface of the workpiece against a reference surface that is fixed against movement in the direction in which the surface of the workpiece is urged against the reference surface;

cutting the workpiece along at least one surface with cutting means;

producing relative longitudinal movement between the workpiece and the cutting means to cut at least the one surface of the workpiece along substantially its entire length;

and maintaining the reference surface a fixed longitudinal distance from the cutting means during machining.

23. The method according to claim 22 including:

urging two surfaces of the workpiece that are at an angle to each other against two reference surfaces at the same angle to each other as the surfaces of the workpiece with each of the reference surfaces being fixed against movement in the direction in which the surface of the workpiece is urged thereagainst;

and cutting at least two surfaces of the workpiece along substantially their entire lengths.

24. The method according to claim 23 including disposing the reference surfaces substantially perpendicular to each other to cooperate with a pair of substantially perpendicular surfaces of the workpiece.

25. The method according to claim 24 in which:

the cutting means is moved longitudinally and the workpiece is fixed;

and the reference surfaces are moved with the cutting means.

26. The method according to claim 22 in which:

the cutting means is moved longitudinally and the workpiece is fixed;

and the reference surface is moved with the cutting means.

27. The method according to claim 22 including directing a cleaning fluid against at least one surface of the workpiece that is being cut.

* * * * *

UNITED STATES PATENT OFFICE
CERTIFICATE OF CORRECTION

Patent No. 3,668,971                    Dated June 13, 1972

Inventor(s) Lewis A. Dever

It is certified that error appears in the above-identified patent and that said Letters Patent are hereby corrected as shown below:

Column 7, line 71 should be indented as a sub-paragraph.

Signed and sealed this 12th day of December 1972.

(SEAL)
Attest:

EDWARD M. FLETCHER, JR.                 ROBERT GOTTSCHALK
Attesting Officer                       Commissioner of Patents